United States Patent
Hart et al.

(10) Patent No.: US 11,671,499 B2
(45) Date of Patent: Jun. 6, 2023

(54) SYSTEM AND METHOD OF ESTABLISHING SERVER CONNECTIONS TO INTERNET OF THINGS DEVICES, INCLUDING ELECTRONIC LOCKS

(71) Applicant: Spectrum Brands, Inc., Middleton, WI (US)

(72) Inventors: James Creighton Hart, Huntington Beach, CA (US); Michael Walker, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 82 days.

(21) Appl. No.: 17/276,077

(22) PCT Filed: Sep. 13, 2019

(86) PCT No.: PCT/US2019/051038
§ 371 (c)(1),
(2) Date: Mar. 12, 2021

(87) PCT Pub. No.: WO2020/056277
PCT Pub. Date: Mar. 19, 2020

(65) Prior Publication Data
US 2022/0046094 A1 Feb. 10, 2022

Related U.S. Application Data

(60) Provisional application No. 62/744,015, filed on Oct. 10, 2018, provisional application No. 62/731,581, filed on Sep. 14, 2018.

(51) Int. Cl.
*H04L 67/12* (2022.01)
*H04L 67/141* (2022.01)
(Continued)

(52) U.S. Cl.
CPC ............ *H04L 67/12* (2013.01); *H04L 67/141* (2013.01); *H04L 67/143* (2013.01); *G16Y 30/10* (2020.01); *H04W 84/12* (2013.01)

(58) Field of Classification Search
CPC ..... H04L 67/12; H04L 67/141; H04L 67/143; G16Y 30/10; H04W 84/12
See application file for complete search history.

(56) References Cited

U.S. PATENT DOCUMENTS 10,291,477 B1 * 5/2019 Askar ................ H04W 4/50
2016/0036814 A1 * 2/2016 Conrad ............ H04L 63/0428
713/171

(Continued)

OTHER PUBLICATIONS

International Search Report and Written Opinion for PCT/US2019/051038, dated Nov. 27, 2019.

*Primary Examiner* — Michael A Keller
(74) *Attorney, Agent, or Firm* — Merchant & Gould P.C.

(57) ABSTRACT

Systems and methods of an internet of things device connecting to a remote server. The internet of things device connects to a web target. The web target sends a response to the internet of things device indicating whether a change to the one or more settings of the internet of things device has been received at a cloud server. If a change has occurred, the internet of things device connects to a secure cloud server to update the settings on the internet of things device.

20 Claims, 10 Drawing Sheets

(51) Int. Cl.
*H04L 67/143* (2022.01)
*G16Y 30/10* (2020.01)
*H04W 84/12* (2009.01)

(56) References Cited

U.S. PATENT DOCUMENTS

| | | | |
|---|---|---|---|
| 2017/0099176 A1* | 4/2017 | Jain | H04L 67/12 |
| 2018/0041856 A1* | 2/2018 | Lou | H04W 4/70 |
| 2018/0165088 A1* | 6/2018 | Bonar | G06F 8/65 |
| 2018/0196945 A1 | 7/2018 | Kornegay et al. | |
| 2019/0140906 A1* | 5/2019 | Furuichi | H04L 41/12 |
| 2019/0354367 A1* | 11/2019 | Rodriguez Bravo | H04L 63/20 |
| 2019/0372952 A1* | 12/2019 | Higuchi | H04L 41/046 |

* cited by examiner

# SYSTEM AND METHOD OF ESTABLISHING SERVER CONNECTIONS TO INTERNET OF THINGS DEVICES, INCLUDING ELECTRONIC LOCKS

CROSS-REFERENCE TO RELATED APPLICATIONS

The present application is a National Stage Application of PCT International patent application No. PCT/US2019/051038, filed Sep. 13, 2019, which claims the benefit of priority to U.S. Provisional Patent Application No. 62/731,581, filed on Sep. 14, 2018, and U.S. Provisional Patent Application No. 62/744,015, filed on Oct. 10, 2018, which applications are incorporated herein by reference. To the extent appropriate, a claim of priority is made to each of the above-disclosed applications.

TECHNICAL FIELD

This invention relates to the field of internet of things devices. More particularly, this invention relates to methods of managing server connections to internet of things devices, such as electronic locks.

BACKGROUND

Many Internet of Things devices require a data communication connection with a server in order to operate. For example, an electronic lock device needs to communicate with a cloud server to perform remote functions. These IoT devices can be updated locally or remotely. The settings associated with the IoT devices may be modeled, or mirrored in the cloud server. Changes to the settings of the IoT device are stored in the cloud server, and then propagated back to the IoT device.

Each time a change to the settings of the IoT device occurs, the change is transmitted relatively quickly to the IoT device. This requires the IoT device to be in regular contact with the cloud server.

However, frequent connections to the cloud have a number of drawbacks. In some cases, cloud service providers may charge a fee to the IoT device manufacturer for each connection; in those cases, frequent connections may be cost-prohibitive. In addition, frequent connections between the IoT device and the cloud may be resource intensive; each connection to the cloud causes access by the IoT device to the cloud model, which is typically secured and therefore requires additional device-cloud communications to establish a secure connection/session each time the IoT device connects. This may require significant additional processing capability by the IoT device, or may affect power consumption (e.g., battery life) of the IoT device.

SUMMARY

The present disclosure relates generally to methods of an internet of things (IoT) device establishing a connection to a cloud server. The IoT device may establish a connection to a web target before establishing a connection to the cloud server.

In a first aspect, an IoT device is described. The IoT device includes a processor and a memory communicatively connected to the processor. The memory stores instructions, which, when executed, cause the IoT device to perform the following steps. At a predetermined time, the IoT device connects to a web target. A response indicating whether a change to one or more settings to the IoT device has been received at a cloud server associated with the IoT device is received from the web target. The contents of the response are assessed. Based on the response indicated that no change to the one or more settings has been received at the cloud server, a connection to the web target is terminated without connecting to a secure IoT server interface of the clouds server. Based on the response indicated that a change to the one or more settings has been received at the cloud server, establishing a connection to the cloud server via a secure IoT server interface, update one or more settings on the IoT device based on the change to the one or more settings at the cloud server, and terminate the connection to the cloud server.

In another aspect, a system comprises a server system hosting a web target, and an IoT device. The IoT device includes a processor and a memory communicatively connected to the processor. The memory stores instructions, which, when executed, cause the IoT device to perform the following steps. At a predetermined time, the IoT device connects to a web target. A response indicating whether a change to one or more settings to the IoT device has been received at a cloud server associated with the IoT device is received from the web target. The contents of the response are assessed. Based on the response indicated that no change to the one or more settings has been received at the cloud server, a connection to the web target is terminated without connecting to a secure IoT server interface of the clouds server. Based on the response indicated that a change to the one or more settings has been received at the cloud server, establishing a connection to the cloud server via a secure IoT server interface, update one or more settings on the IoT device based on the change to the one or more settings at the cloud server, and terminate the connection to the cloud server.

In yet another aspect, a system includes a server system hosting a web target, a mobile device application, and an IoT device. The IoT device includes a processor and a memory communicatively connected to the processor. The memory stores instructions, that when executed, causes the IoT device to: receive an external state change request imitated by the mobile device application, establish a connection to the cloud server via a secure internet of things server interface, update one or more settings on the IoT device based on the change to the one or more settings at the cloud server, and terminate the connection to the cloud server.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
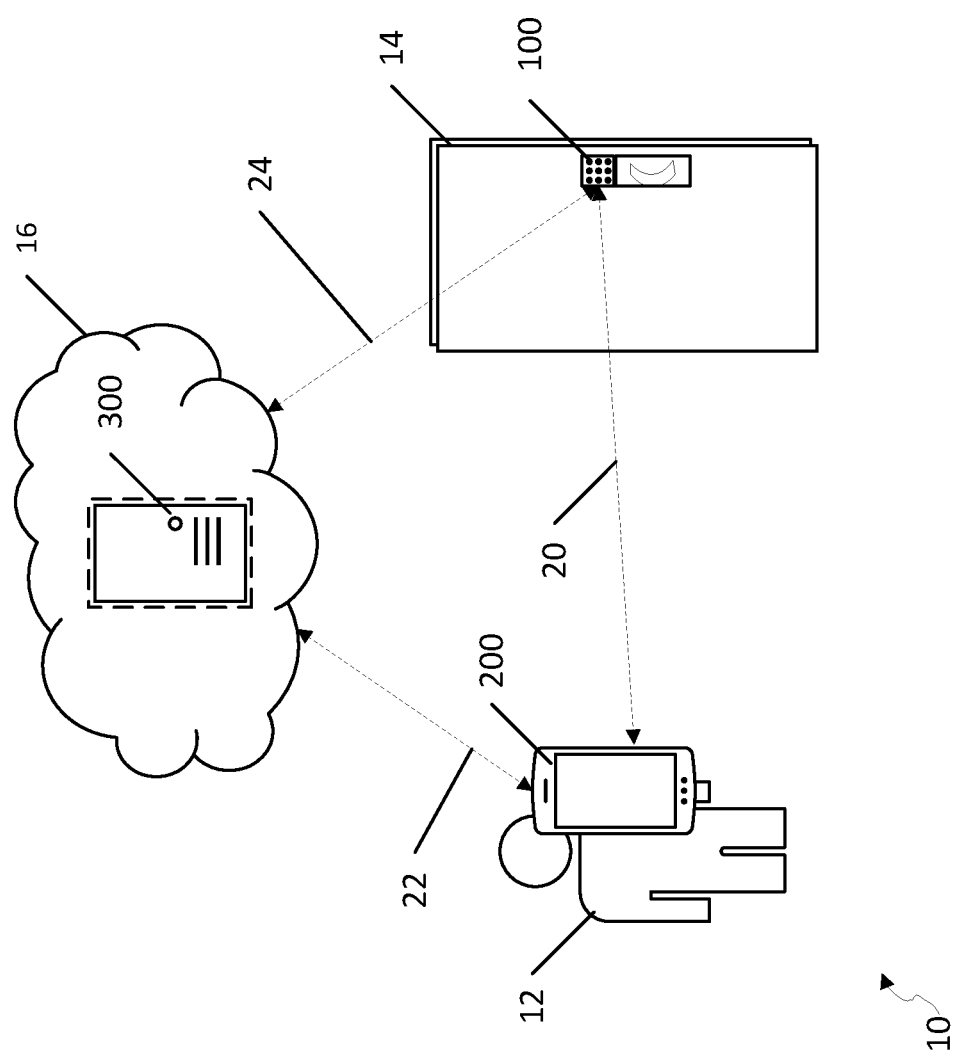
FIG. 1 illustrates an environment in which aspects of the present disclosure may be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to connections between an IoT device, such as a smart security device and a remote server. In some embodiments, the IoT device connects via a router to the internet. The IoT device is able to connect to either a web target server and/or a secure cloud server. In certain embodiments, connections to a secure cloud server are managed such that changes to IoT device settings at the cloud server are quickly and easily checked, since in many circumstances, these will remain unchanged when they are checked periodically by the IoT device. When changes are detected, a separate connection process requiring detailed authentication can be performed, which allows the IoT device to exchange information about settings only after a higher level of trust is established between that device and the secure cloud server. This maintains high security for the device, while avoiding power and bandwidth intensive operations that may occur each time the device connects to the server in the more typical instance that no setting changes are made between times the IoT device connects to the server.

In example aspects, various wireless protocols can be used. In example embodiments, a Wi-Fi protocol (802.11x) may be used to connect the electronic lock to a server (cloud) device, while a different wireless protocol (e.g., Bluetooth, including Bluetooth Low Energy, or BLE) used for short-range communication between the electronic lock and other devices, such as a mobile device used to actuate the lock. In other embodiments, various other wireless protocols can be used, such as other short- or long-range wireless protocols (e.g., cellular, RFID/NFC, Zigbee, Z-wave, etc.).

The term "lock" or "lockset" is broadly intended to include any type of lock, including but not limited to, deadbolts, knob locks, lever handle locks, mortise locks and slide locks, whether mechanical, electrical, or electro-mechanical locks. The locking points may have various mounting configurations and/or locations, including but not limited to: mortised within the doorframe, mounted externally to the doorframe or support structure, and/or affixed directly to the door.

Although this disclosure describes these features as implemented on an electronic deadbolt lock for purposes of example, these features are applicable to any type of lockset, including but not limited to, deadbolts, knobset locks, handleset locks, etc. Still further, example aspects of the present application can be applied to other types of IoT devices for which security is an issue, e.g., wireless/interconnected home devices that store user data.

FIG. 1 illustrates an environment 10 in which aspects of the present disclosure may be implemented. A user 12 has a phone or other mobile device 200 with wireless communication capabilities. The user 12 is an authorized person desiring to unlock (or lock) a door 14. The door 14 includes an electronic lock 100 (also referred to as a wireless electronic lockset). In alternative embodiments, this may be any IoT device. The mobile device 200 is capable of communicating 22 with a server 300 and communicating 20 with the electronic lock 100. The server 300 can be, for example, a physical server or a virtual server hosted in a cloud storage environment 16. In some embodiments, the electronic lock 100 is also capable of communicating 24 with the server 300. Such communication can optionally occur via one or more wireless communication protocols, e.g., Wi-Fi (IEEE 802.11), short-range wireless communication to a Wi-Fi bridge, or other connection mechanism. The server 300 generally authenticates the electronic lock 100 before establishing a secure connection. Alternatively, the electronic lock 100 can authenticate the server 300 to establish a secure connection. In some instances, the server 300 and the electronic lock 100 operate to mutually authenticate each other in order to provide a higher level of security when establishing a connection.

Figure 2:
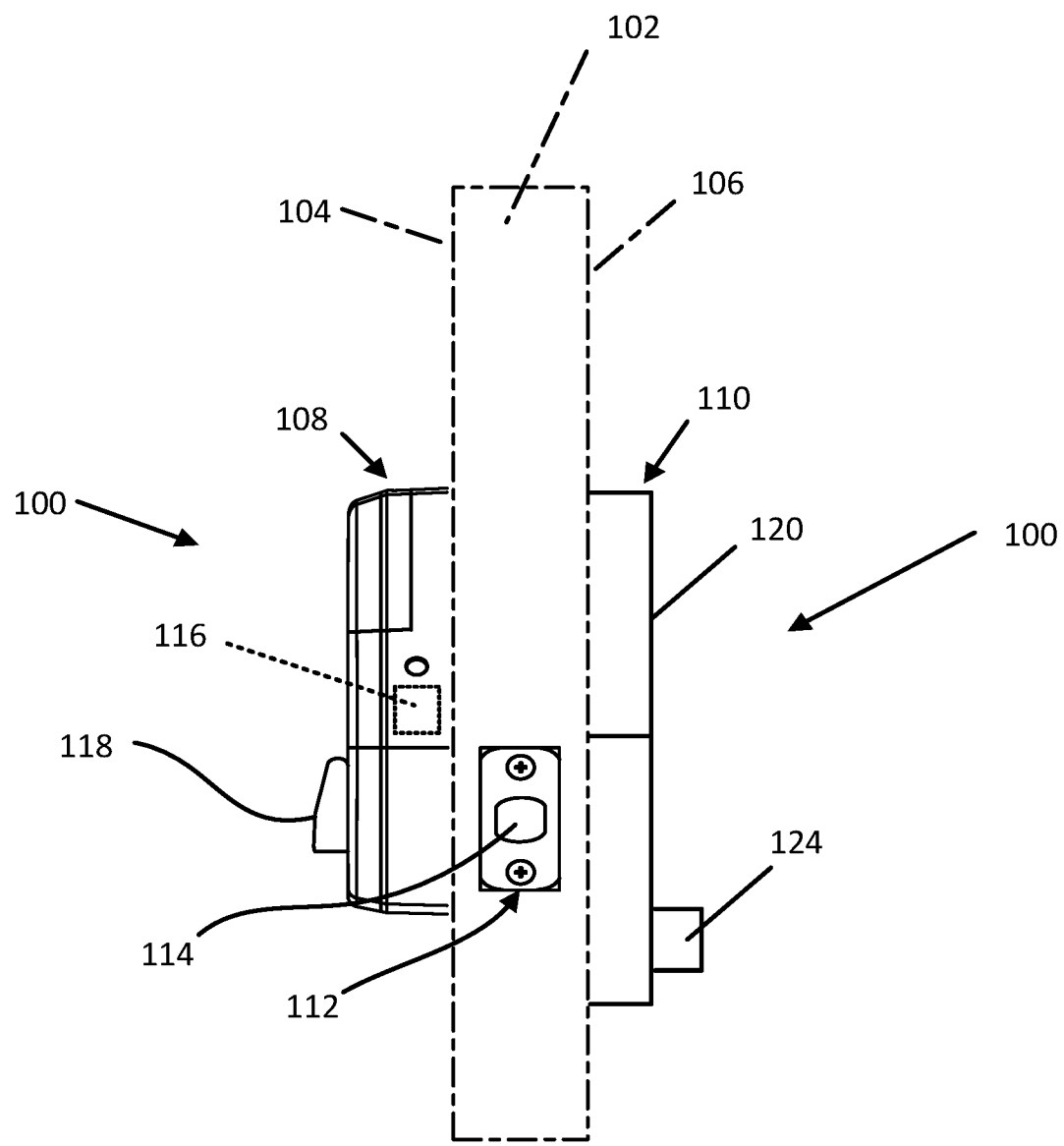
FIG. 2 illustrates a side view of a portion of the electronic lock seen in the environment of FIG. 1.
Figure 3:
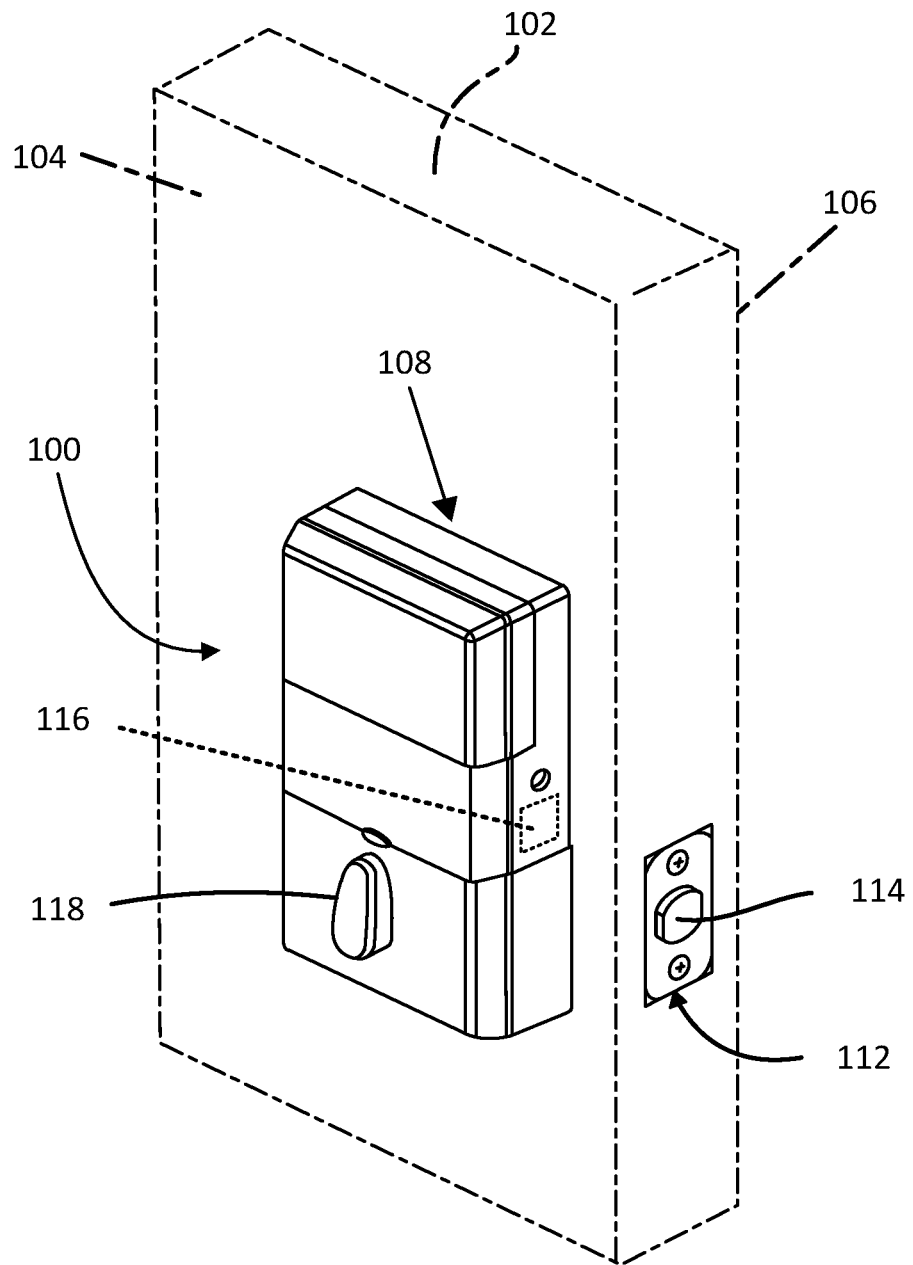
FIG. 3 illustrates a rear perspective view of a portion of the electronic lock seen in the environment of FIG. 1.
Figure 4:
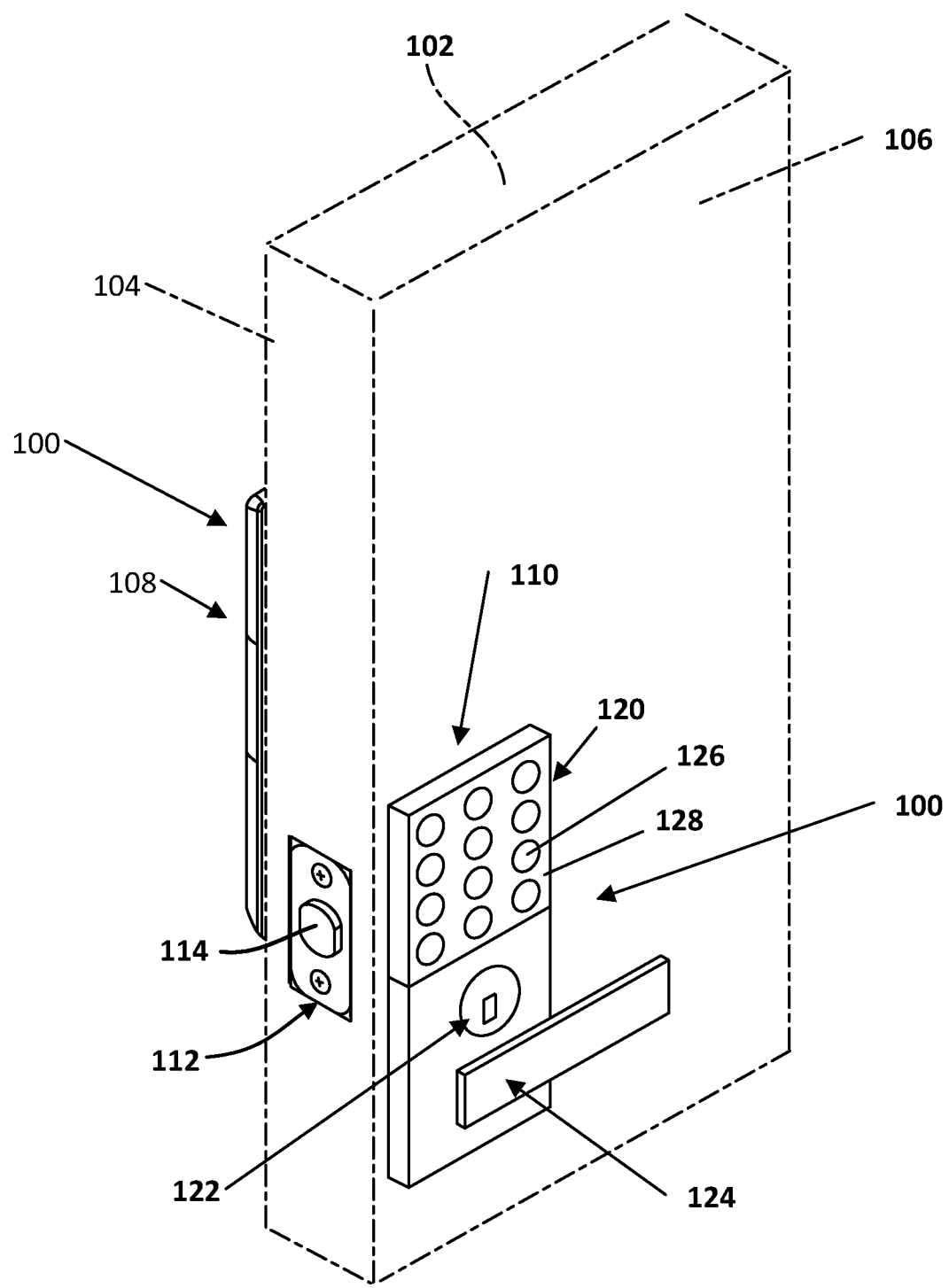
FIG. 4 illustrates a front perspective view of a portion of the electronic lock seen in the environment of FIG. 1.

FIGS. 2-4 illustrate an electronic lock 100 as installed at a door 102, according to one example of the present disclosure. The door has an interior side 104 and an exterior side 106. The electronic lock 100 includes an interior assembly 108, an exterior assembly 110, and a latch assembly 112. The latch assembly 112 is shown to include a bolt 114 that is movable between an extended position (locked) and a retracted position (unlocked, shown in FIGS. 2-4). Specifically, the bolt 114 is configured to slide longitudinally and, when the bolt 114 is retracted, the door 102 is in an unlocked state. When the bolt 114 is extended, the bolt 114 protrudes from the door 102 into a doorjamb (not shown) to place the door in a locked state.

In some examples, the interior assembly 108 is mounted to the interior side 104 of the door 102, and the exterior assembly 110 is mounted to the exterior side 106 of the door 102. The latch assembly 112 is typically at least partially mounted in a bore formed in the door 102. The term "outside" is broadly used to mean an area outside the door 102 and "inside" is also broadly used to denote an area inside the door 102. With an exterior entry door, for example, the exterior assembly 110 may be mounted outside a building, while the interior assembly 108 may be mounted inside a building. With an interior door, the exterior assembly 110 may be mounted inside a building, but outside a room secured by the electronic lock 100, and the interior assembly 108 may be mounted inside the secured room. The electronic lock 100 is applicable to both interior and exterior doors.

Referring to FIG. 3, the interior assembly 108 can include a processing unit 116 (shown schematically) containing electronic circuitry for the electronic lock 100. In some examples, the interior assembly 108 includes a manual turn piece 118 that can be used on the interior side 104 of door 102 to move the bolt 114 between the extended and retracted positions.

The processing unit 116 is operable to execute a plurality of software instructions (i.e., firmware) that, when executed by the processing unit 116, cause the electronic lock 100 to implement the methods and otherwise operate and have functionality as described herein.

The processing unit 116 may comprise a device commonly referred to as a processor, e.g., a central processing unit (CPU), digital signal processor (DSP), or other similar device, and may be embodied as a standalone unit or as a device shared with components of the electronic lock 100. The processing unit 116 may include memory communicatively interfaced to the processor, for storing the software instructions. Alternatively, the electronic lock 100 may further comprise a separate memory device for storing the software instructions that is electrically connected to the processing unit 116 for the bi-directional communication of the instructions, data, and signals therebetween.

Referring to FIG. 4, the exterior assembly 110 can include exterior circuitry 117 (see FIG. 5) communicatively and electrically connected to the processing unit 116. For example, the exterior assembly 110 can include a keypad 120 for receiving a user input and/or a keyway 122 for receiving a key (not shown). The exterior side 106 of the door 102 can also include a handle 124. In some examples, the exterior assembly 110 includes the keypad 120 and not the keyway 122. In some examples, the exterior assembly 110 includes the keyway 122 and not the keypad 120. In some examples, the exterior assembly 110 includes the keyway 122 and the keypad 120. When a valid key is inserted into the keyway 122, the valid key can move the bolt 114 between the extended and retracted positions. When a user inputs a valid code into the keypad 120, the bolt 114 is moved between the extended and retracted positions.

In some examples, the exterior assembly 110 is electrically connected to the interior assembly 108. Specifically, the keypad 120 is electrically connected to the interior assembly 108, specifically to the processing unit 116, by, for example, an electrical cable (not shown) that passes through the door 102. When the user inputs a valid code via keypad 120 that is recognized by the processing unit 116, an electrical motor is energized to retract the bolt 114 of latch assembly 112, thus permitting door 102 to be opened from a closed position. Still further, an electrical connection between the exterior assembly 110 and the interior assembly 108 allows the processing unit 116 to communicate with other features included in the exterior assembly 110, as noted below.

The keypad 120 can be any of a variety of different types of keypads. The keypad 120 can be one of a numeric keypad, an alpha keypad, and/or an alphanumeric keypad. The keypad 120 can have a plurality of characters 126 displayed thereon. For example, the keypad 120 can include a plurality of buttons that can be mechanically actuated by the user (e.g., physically pressed). In some examples, the keypad 120 includes a touch interface 128, such as a touch screen or a touch keypad, for receiving a user input. The touch interface 128 is configured to detect a user's "press of a button" by contact without the need for pressure or mechanical actuation. An example of the touch interface is described in U.S. Pat. No. 9,424,700 for an "ELECTRONIC LOCK HAVING USAGE AND WEAR LEVELING OF A TOUCH SURFACE THROUGH RANDOMIZED CODE ENTRY," which is hereby incorporated by reference in its entirety.

In alternative embodiments, one or more other types of user interface devices could be incorporated into the electronic lock 100. For example, in example implementations, the exterior assembly 110 can include a biometric interface (e.g., a fingerprint sensor, retina scanner, or camera including facial recognition), or an audio interface by which voice recognition could be used to actuate the lock. Still further, other touch interfaces may be implemented, e.g., where a single touch may be used to actuate the lock rather than requiring entry of a specified code.

Figure 5:
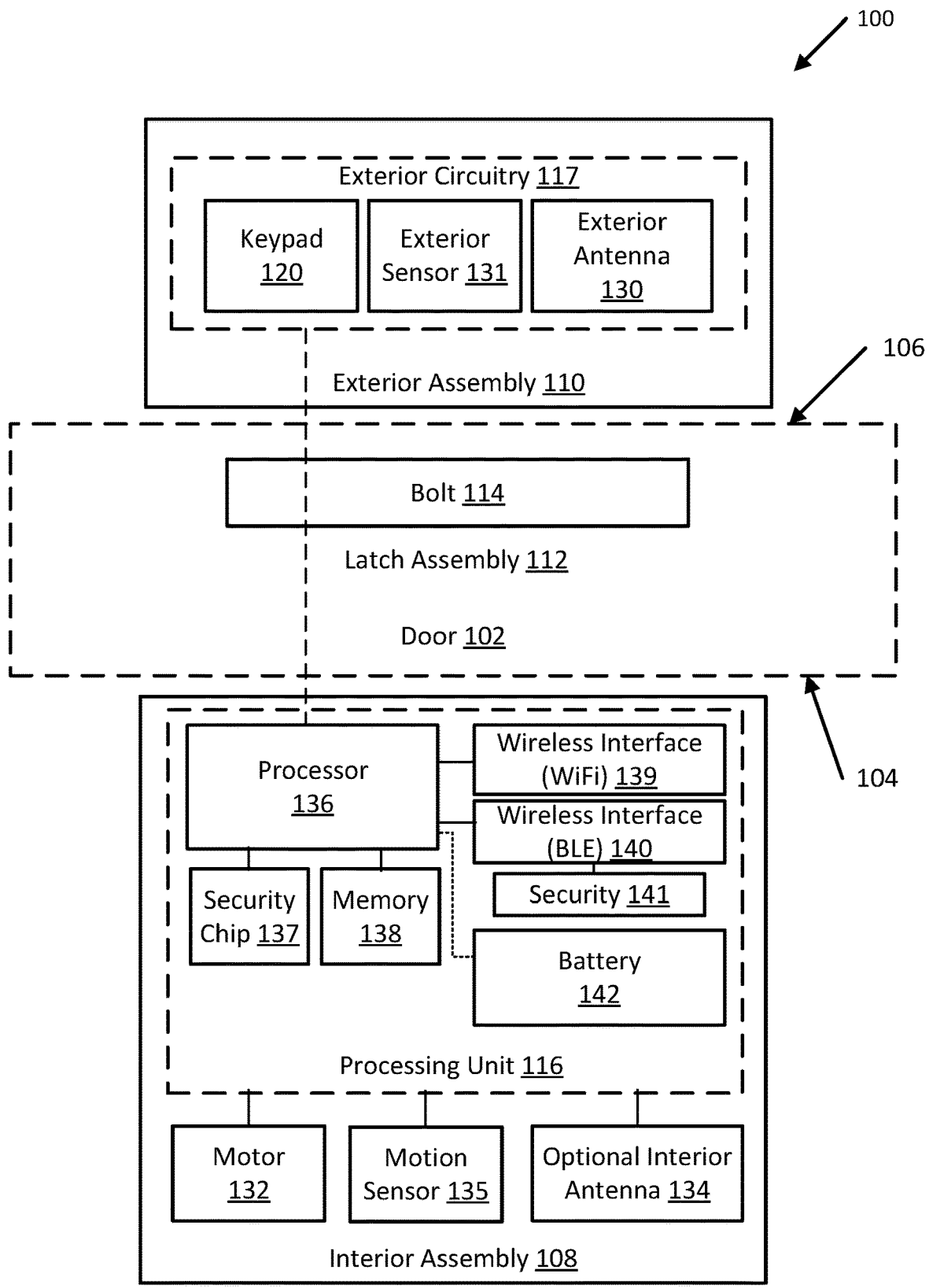
FIG. 5 illustrates a schematic representation of the electronic lock seen in the environment of FIG. 1.

FIG. 5 is a schematic representation of the electronic lock 100 mounted to the door 102. The interior assembly 108, the exterior assembly 110, and the latch assembly 112 are shown.

The exterior assembly 110 is shown to include the keypad 120 and an optional exterior antenna 130 usable for communication with a remote device. In addition, the exterior assembly 110 can include one or more sensors 131, such as a camera, proximity sensor, or other mechanism by which conditions exterior to the door 102 can be sensed. In response to such sensed conditions, notifications may be sent by the electronic lock 100 to a server 300 or mobile device 200, including information associated with the sensed event (e.g., time and description of the sensed event, or remote feed of sensor data obtained via the sensor).

The exterior antenna 130 is capable of being used in conjunction with an interior antenna 134, such that the processing unit 116 can determine where a mobile device is located. Only a mobile device 200 determined to be located on the exterior of the door is able to actuate (unlock or lock) the door. This prevents unauthorized users from being located exterior to the door 102 of the electronic lock and taking advantage of an authorized mobile device that may be located on the interior of the door, even though that authorized mobile device is not being used to actuate the door. However, such a feature is not required, but can add additional security. In alternative arrangements, the electronic lock 100 is only actuable from either the keypad 120 (via entry of a valid code) or from an application installed on the mobile device 200. In such arrangements, because touch alone at the exterior of the door cannot actuate the lock, the exterior antenna 130 may be excluded entirely.

As described above, the interior assembly 108 includes the processing unit 116. The interior assembly 108 can also include a motor 132 and an optional interior antenna 134.

As shown, the processing unit 116 includes at least one processor 136 communicatively connected to a security chip 137, a memory 138, various wireless communication interfaces (e.g., including a Wi-Fi interface 139 and Bluetooth interface 140), and a battery 142. The processing unit 116 is located within the interior assembly 108 and is capable of operating the electronic lock 100, e.g., by actuating a motor 132 to actuate the bolt 114.

In some examples, the processor 136 can process signals received from a variety of devices to determine whether the electronic lock 100 should be actuated. Such processing can be based on a set of preprogramed instructions (i.e., firmware) stored in the memory 138. In certain embodiments, the processing unit 116 can include a plurality of processors 136, including one or more general purpose or specific purpose instruction processors. In some examples, the processing unit 116 is configured to capture a keypad input event from a user and store the keypad input event in the memory 138. In other examples, the processor 136 receives a signal from the exterior antenna 130, the interior antenna 134, or a motion sensor 135 (e.g., a vibration sensor, gyroscope, accelerometer, motion/position sensor, or combination thereof) and can validate received signals in order to actuate the lock 100. In still other examples, the processor 136 receives signals from the Bluetooth interface 140 to determine whether to actuate the electronic lock 100.

In some embodiments, the processing unit 116 includes a security chip 137 that is communicatively interconnected with one or more instances of processor 136. The security chip 137 can, for example, generate and store cryptographic information usable to generate a certificate usable to validate the electronic lock 100 with a remote system, such as the server 300 or mobile device 200. In certain embodiments, the security chip 137 includes a one-time write function in which a portion of memory of the security chip 137 can be written only once, and then locked. Such memory can be used, for example, to store cryptographic information derived from characteristics of the electronic lock 100, or its communication channels with server 300 or one or more mobile devices 200. Accordingly, once written, such cryptographic information can be used in a certificate generation process which ensures that, if any of the characteristics reflected in the cryptographic information are changed, the certificate that is generated by the security chip 137 would become invalid, and thereby render the electronic lock 100 unable to perform various functions, such as communicate with the server 300 or mobile device 200, or operate at all, in some cases. Details regarding configuration of an electronic lock 100 to include security features, including authenticating communications between the electronic lock and a cloud server, are provided below.

The memory 138 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

As noted above, the processing unit 116 can include one or more wireless interfaces, such as Wi-Fi interface 139 and Bluetooth interface 140. Other RF circuits can be included as well. In the example shown, the interfaces 139, 140 are capable of communication using at least one wireless communication protocol. In some examples, the processing unit 116 can communicate with a remote device via the Wi-Fi interface 139, or a local device via the Bluetooth interface 140. In some examples, the processing unit 116 can communicate with one or both of the mobile device 200 and server 300 via the Wi-Fi interface, and can communicate with the mobile device 200 when the mobile device is in proximity to the electronic lock 100 via the Bluetooth interface 140. In some embodiments, the processing unit 116 is configured to communicate with the mobile device 200 via the Bluetooth interface 140, and communications between the mobile device 200 and electronic lock 100 when the mobile device 200 is out of range of Bluetooth wireless signals can be relayed via the server 300, e.g., via the Wi-Fi interface 139.

Of course, in alternative embodiments, other wireless protocols could be implemented as well, via one or more additional wireless interfaces. In some examples, the electronic lock 100 can wirelessly communicate with external devices through a desired wireless communications protocol. In some examples, an external device can wirelessly control the operation of the electronic lock 100, such as operation of the bolt 114. The electronic lock 100 can utilize wireless protocols including, but not limited to, the IEEE 802.11 standard (Wi-Fi), the IEEE 802.15.4 standard (Zigbee and Z-wave), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment.

In a particular embodiment, the processor 136 will receive a signal at the Bluetooth interface 140 via a wireless communication protocol (e.g., BLE) from a mobile device 200, for communication of an intent to actuate the electronic lock 100. As illustrated in further detail below, the processor 136 can also initiate communication with the server 300 via Wi-Fi interface 139 (or another wireless interface) for purposes of validating an attempted actuation of the electronic lock 100, or receiving an actuation command to actuate the electronic lock 100. Additionally, various other settings can be viewed and/or modified via the Wi-Fi interface 139 from the server 300; as such, a user of a mobile device 200 may access an account associated with the electronic lock 100 to view and modify settings of that lock, which are then propagated from the server 300 to the electronic lock 100. In alternative embodiments, other types of wireless interfaces can be used; generally, the wireless interface used for communication with a mobile device can operate using a different wireless protocol than a wireless interface used for communication with the server 300.

In a particular example, the Bluetooth interface 140 comprises a Bluetooth Low Energy (BLE) interface. Additionally, in some embodiments, the Bluetooth interface 140 is associated with a security chip 141, for example, a cryptographic circuit capable of storing cryptographic information and generating encryption keys usable to generate certificates for communication with other systems, e.g., mobile device 200.

The interior assembly 108 also includes the battery 142 to power the electronic lock 100. In one example, the battery 142 may be a standard single-use (disposable) battery. Alternatively, the battery 142 may be rechargeable. In still further embodiments, the battery 142 is optional altogether, replaced by an alternative power source (e.g., an AC power connection).

The interior assembly 108 also includes the motor 132 that is capable of actuating the bolt 114. In use, the motor 132 receives an actuation command from the processing unit 116, which causes the motor 132 to actuate the bolt 114 from the locked position to the unlocked position or from the unlocked position to the locked position. In some examples, the motor 132 actuates the bolt 114 to an opposing state. In some examples, the motor 132 receives a specified lock or unlock command, where the motor 132 only actuates the bolt 114 if the bolt 114 is in the correct position. For example, if the door 102 is locked and the motor 132 receives a lock command, then no action is taken. If the door 102 is locked and the motor 132 receives an unlock command, then the motor 132 actuates the bolt 114 to unlock the door 102.

As noted above, the optional interior antenna 134 may also be located in the interior assembly 108. In some examples, the interior antenna 134 is capable of operating together with the exterior antenna 130 to determine the location of the mobile device 200. In some examples, only a mobile device determined to be located on the exterior side 106 of the door 102 is able to unlock (or lock) the door 102. This prevents unauthorized users from being located near the electronic lock 100 and taking advantage of an authorized mobile device that may be located on the interior side 104 of the door 102, even though the authorized mobile device is not being used to unlock the door 102. In alternative embodiments, the interior antenna 134 can be excluded entirely, since the electronic lock 100 is actuated only by an authorized mobile device.

Referring to FIGS. 2-5 generally, in example embodiments, the electronic lock 100 may be used on both interior and exterior doors. Described below are non-limiting examples of a wireless electronic lockset. It should be noted that the electronic lock 100 may be used on other types of doors, such as a garage door or a doggie door, or other types of doors that require an authentication process to unlock (or lock) the door.

In some embodiments, the electronic lock 100 is made of mixed metals and plastic, with engineered cavities to contain electronics and antennas. For example, in some embodiments, the lock utilizes an antenna near the exterior face of the lockset, designed inside the metal body of the lockset itself. The metal body can be engineered to meet strict physical security requirements and also allow an embedded front-facing antenna to propagate RF energy efficiently.

In still further example embodiments, the electronic lock 100 can include an integrated motion sensor 135. Using such a motion sensor (e.g., an accelerometer, gyroscope, or other position or motion sensor) and wireless capabilities of a mobile device or an electronic device (i.e., fob) with these capabilities embedded inside can assist in determining additional types of events (e.g., a door opening or door closing event, a lock actuation or lock position event, or a knock event based on vibration of the door). In some cases, motion events can cause the electronic lock 100 to perform certain processing, e.g., to communicatively connect to or transmit data to a mobile device 200 in proximity to the electronic lock 100.

Of course, in alternative embodiments, other lock actuation sequences may not require use of a motion sensor 135. For example, if the mobile device 200 is in valid range of the electronic lock 100 when using a particular wireless protocol (e.g., Bluetooth Low Energy), then a connection will be established with the electronic lock 100. Other arrangements are possible as well, using other connection sequences and/or communication protocols.

Figure 6:
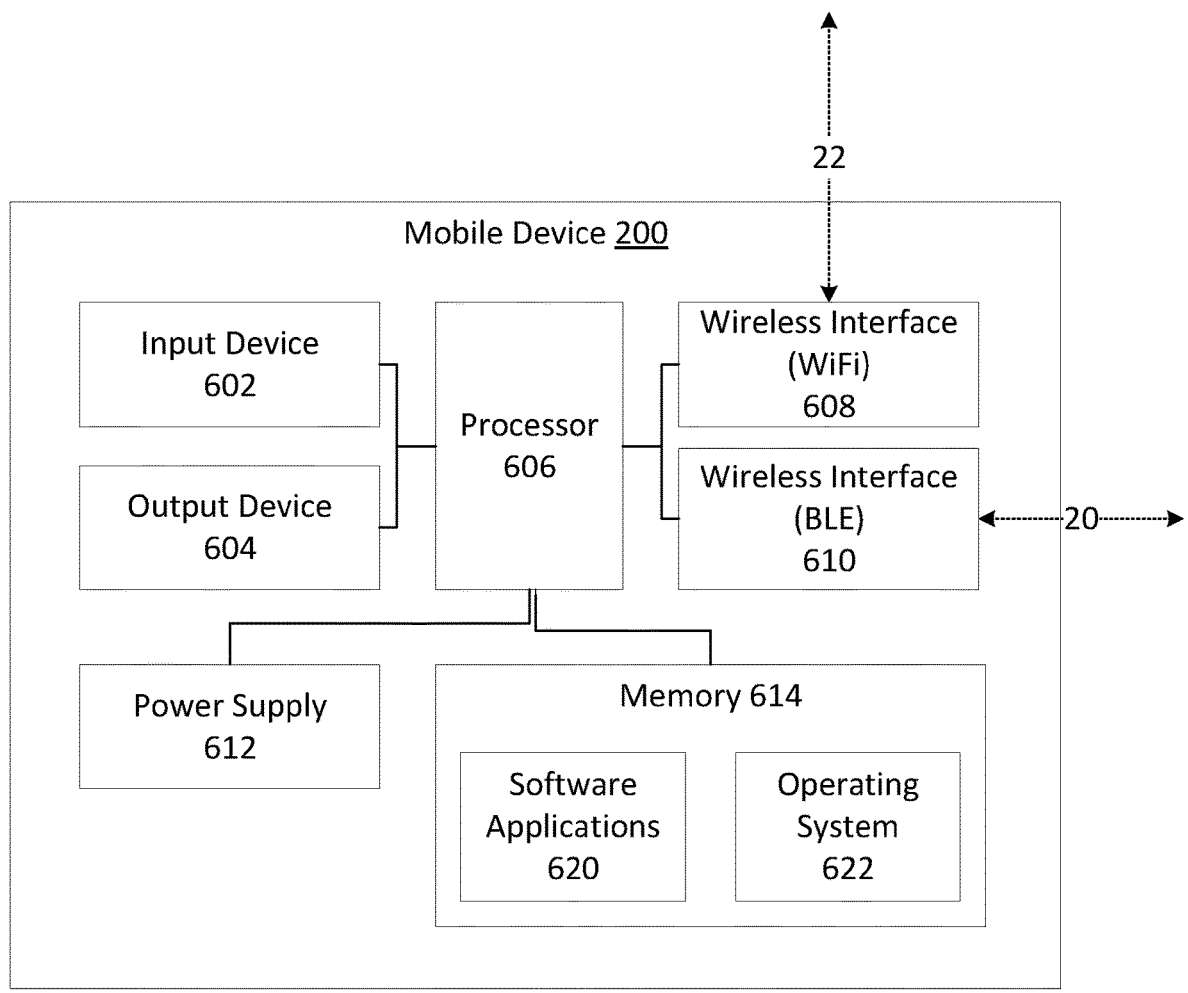
FIG. 6 illustrates a schematic representation of the mobile device seen in the environment of FIG. 1.

FIG. 6 illustrates a schematic diagram of a mobile device 200 usable in embodiments of the disclosure to authenticate an IoT device with a cloud server. In some embodiments, the mobile device 200 operates to form a Bluetooth or BLE connection with a network enabled security device such as an electronic lock. The mobile device 200 then communicates with a cloud server via a Wi-Fi or mobile data connection. The mobile device 200 thus operates to communicate information between the lock and the server. In other embodiments, the mobile device 200 is not required because the IoT device is network enabled such that it can connected via Wi-Fi to the cloud server. The mobile device 200 shown in FIG. 6 includes an input device 602, an output device 604, a processor 606, a wireless Wi-Fi interface 608, a wireless BLE interface 610, a power supply 612, and a memory 614.

The input device 602 operates to receive input from external sources. Such sources can include inputs received from a user. The inputs can be received through a touchscreen, a stylus, a keyboard, etc.

The output device 604 operates to provide output of information from the mobile device 200. For example, a display could output visual information while a speaker could output audio information.

The processor 606 reads data and instructions. The data and instructions can be stored locally, received from an external source, or accessed from removable media.

The wireless interface 608 is similar to the Wi-Fi interface 139. A Wi-Fi connection 22 can be established with the server 300.

The wireless interface 610 is similar to the Bluetooth interface 140. A BLE connection 20 can be established with the electronic lock 100.

The power supply 612 provides power to the processor.

The memory 614 includes software applications 620 and an operating system 622. The memory 614 contains data and instructions that are usable by the processor to implement various functions of the mobile device 200.

The software applications 620 can include applications usable to perform various functions on the mobile device 200. One such application is an IoT application. The IoT application 626 can operate to access and control devices that are connected to the mobile device through a network.

Figure 7:
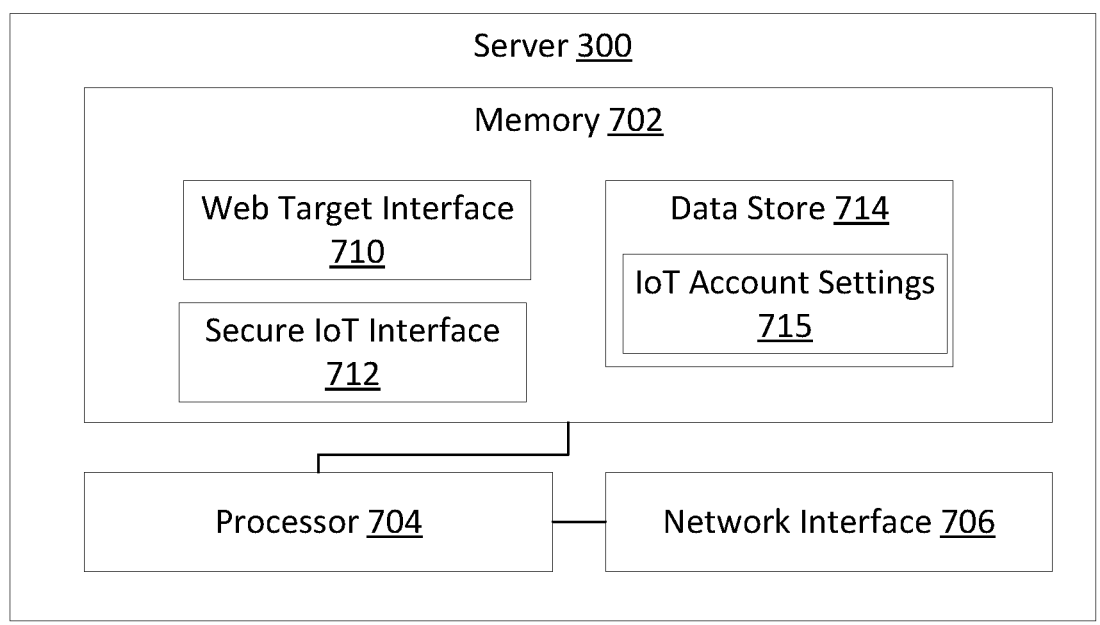
FIG. 7 illustrates a schematic representation of the cloud server seen in the environment of FIG. 1.

FIG. 7 illustrates a schematic diagram of a server 300 usable in embodiments of the disclosure to authenticate an IoT device. The server 300 can be owned and maintained by a manufacturer of an IoT device that needs to be authenticated before use, or can be a virtual server provided by a cloud hosting service to such a manufacturer for use. In example embodiments, the server 300 can be implemented using a scalable set of cloud-based computing resources; the components described herein are intended, therefore, as simply illustrative. Accordingly, in the example shown, the server 300 includes a memory 702, a processor 704, and a network interface 706.

The memory 702 stores instructions defining a web target interface 710, a secure IoT interface 712, and a data store 714. The processor 704 operates to execute instructions stored in the memory 702. The network interface 706 operates to establish connections with IoT devices such as an electronic lock 100 as well as mobile device 200 via a network connection such as Wi-Fi, cellular, etc.

The web target interface 710 and secure IoT interface 712, when executed by the processor 704, manage connections from IoT devices to the data store 714, which stores a set of mirrored IoT device settings 715 for each IoT device connected to and associated with the server 300. The web target interface 710 may be an interface by which a user may access cloud infrastructure, such as a free or low-cost interface that has limited security requirements and therefore limited bandwidth. The web target interface can be accessed via, e.g., a particular URL and extension that uniquely identifies the IoT device that is attempting to connect to the web target interface via the network interface 706. The secure IoT interface 712 may enforce a higher level of security, or may require additional communication (e.g., constant comparison against a set of mirrored IoT device settings 715). The secure IoT interface 712 can be used to direct access the data store 714 to read or modify settings in one or more of the mirrored IoT device settings 715. Generally, interfaces 710, 712 operate to verify connections from the IoT device, generate valid resource responses, and update reported states. The functions of the server 300 are further described in the method of FIGS. 8-10.

Figure 8:
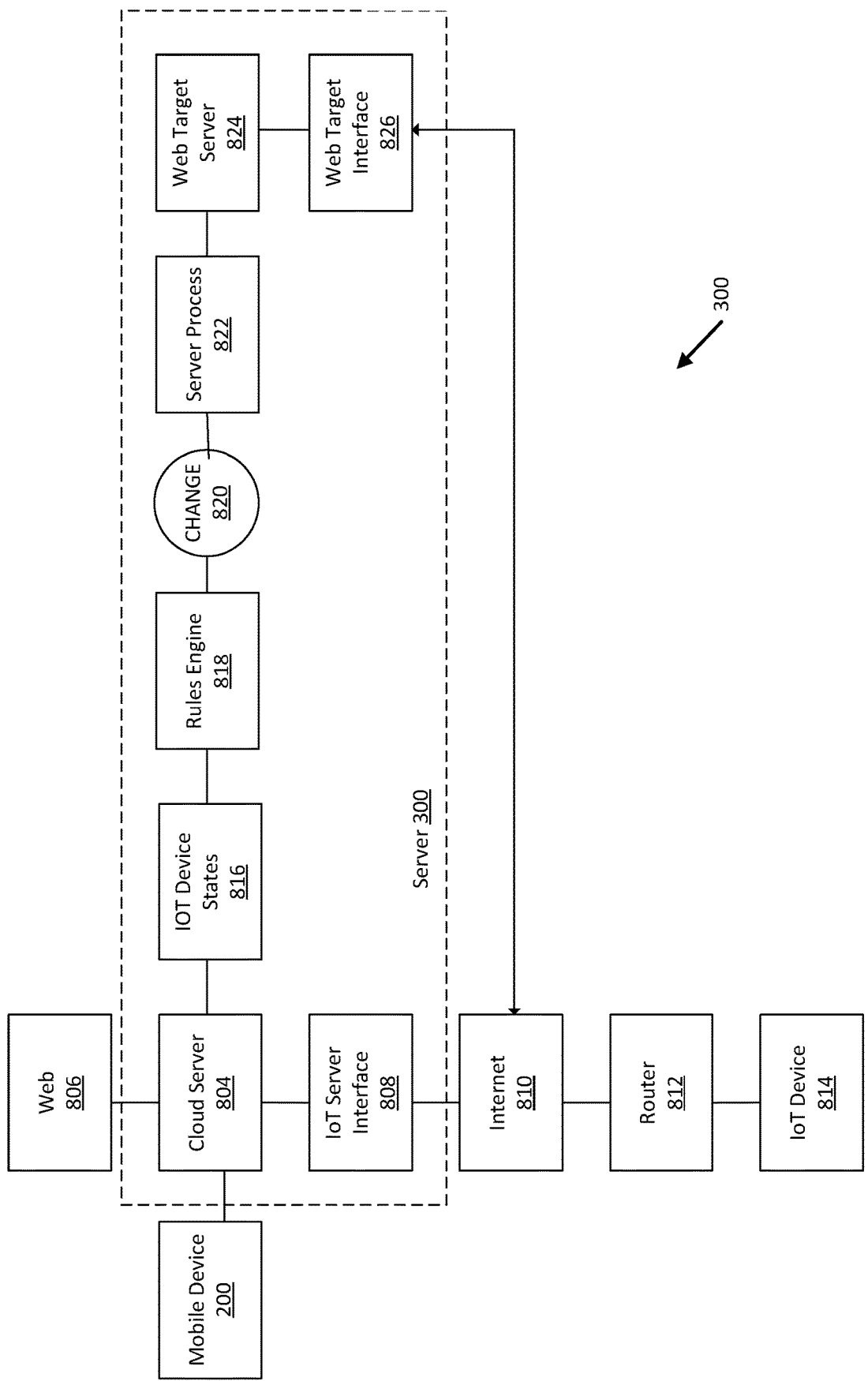
FIG. 8 illustrates a logical block diagram of a particular implementation of the environment of FIG. 1.

FIG. 8 illustrates a more detailed view of a system for efficiently establishing connections with a server, in particular where the server is implemented in a cloud environment. In the example shown, server 300 is illustrated as connected to a mobile device 200 as well as an IoT device 814, such as electronic lock 100.

In the example shown, the server 300 hosts a cloud server 804 which controls access to IoT device settings 816, which represents a set of mirrored settings of the IoT device. The cloud server 806 can also be connected to the Internet 810, for example, for connection by other types of devices or administrative access.

In the example shown, and as used in example IoT installations, an IoT server interface 808 provides a secure interface by which the IoT device 814 can be updated by accessing the cloud server 804 for sending updates to or receiving updates from the IoT device settings 816. Mirrored updates may also be received from the mobile device 200 at the server 300. When the IoT device connects to the cloud server 804 via the IoT server interface 808, the IoT device can connect, for example via WiFi, to a local router 812, which accesses the IoT server interface via the Internet 810.

To ensure consistent settings are being maintained between the IoT device 814 and the IoT device settings 816, the IoT device 814 may be configured to periodically communicate with the server 300. This may occur, for example, every five minutes, or otherwise when the IoT device has been activated from a low power state (e.g., by receiving a local connection from a mobile device 200, such as a Bluetooth connection). However, as noted above, in many instances, the IoT device 814 may have no updates to be applied (e.g., no settings in the IoT device settings 816 have been updated). Accordingly, access via the IoT server interface 808 may be inefficient, since such contact incurs costs when the server 300 is hosted at a third party cloud computing site, and in any event, requires establishment of a connection that requires more processing of response message(s), and therefore uses more bandwidth and power than a "lighter-weight" connection. For example, when an IoT device 814 connects to the server 300 at the IoT server interface 808, the IoT server interface 808 may act to validate the IoT device, requiring it to generate encryption keys, assess changes relative to an IoT mirror, or perform other power-hungry or bandwidth intensive communication/ handshaking algorithms.

Accordingly, in the present example embodiment, a web target interface 826 is provided at the server 300 as well. The web target interface 826 is accessible by the IoT device 814 via the Internet 810 similarly to the IoT server interface 808, but is isolated form and cannot access the IoT device settings 816. Accordingly, the web target interface 826 does not need to have the same security concerns as in the IoT server interface 808. The web target interface 826 is therefore generally a lower cost, less bandwidth-intensive communication interface than the IoT server interface 808. The web target interface 826 generally presents a web target that is unique to each IoT device 814 or IoT device connection sequence, and allows the IoT device 814 to quickly determine, by way of a simple status response, whether there is a change to one or more settings in the IoT device settings 816 that would require the IoT device 814 to synchronize settings with the IoT device settings 816 via the IoT server interface 808.

Each web target can be hosted by a web target server 824 that is exposed by the web target interface 826. The web target server 824 receives indications of changes to the IoT device settings 816 via one or more rules 818, which may monitor the mirror and trigger a change notification 820 upon a change occurring in the IoT device settings 816. The change notification 820 can be managed by a server process 822 which stores the change notification in the web target server 824 at a location unique to the IoT device 814. Accordingly, the IoT device 814 can, instead of periodically accessing the server via the IoT server interface 808 and incurring substantial communication bandwidth and authentication techniques that may have a detrimental impact on performance and battery life of the IoT device, periodically access the server via the web target interface 826 to quickly obtain a compact response indicating whether a change has occurred to the IoT device settings 816 that would require update. In example embodiments, the IoT device 814 can access the web target server 824 using a unique resource identifier (e.g., a URL) that is unique to the device for purposes of obtaining a status notification in response that is specific to that IoT device.

In operation, the IoT device 814 will periodically connect to the server 300 via the web target interface 826 to determine whether a state change has occurred to the IoT device settings 816. The web target server 824 will return a response to the IoT device based on notifications it receives from a server process 822, based on rules 818 set to trigger in response to changes at the IoT device settings 816. If no change has occurred, the IoT device 814 disconnects from the server 300. Once the IoT device 814 is disconnected, a delay timer is started to determine a next time to check for changes.

However, if a change has occurred, the IoT device will connect to the server 300 via the IoT server interface 808 and access cloud server 804, which will provide updates regarding settings in the IoT device settings 816. Changes to the one or more settings to the IoT device that trigger the IoT device to connect to the cloud server 804 include an indication that a change has occurred to the IoT device 814. If the IoT device 814 is an electronic lock, the indication that a change has occurred may be a lock or unlock command. The IoT device 814 is also triggered to connect to the cloud server 804 when no endpoint response is received from the web target interface 826, indicating that the web target server 824 is inoperable or unresponsive. Changes to the one or more settings to the IoT device 814 that do not trigger the IoT device 814 to subsequently connect to the cloud server 804 is an indication that no change has occurred.

Figure 9:
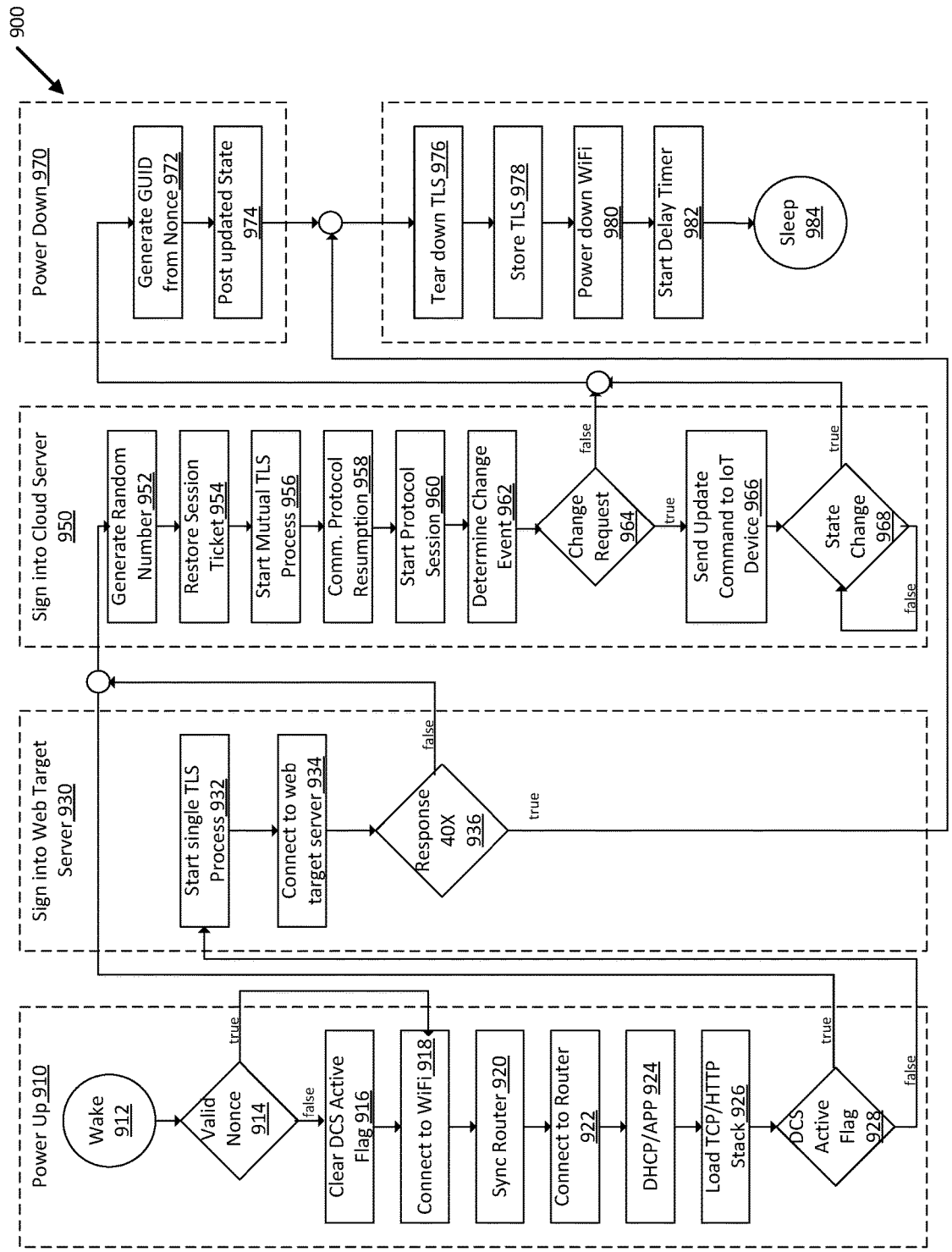
FIG. 9 illustrates a flowchart of a method of mutually authenticating devices within the environment of FIG. 1.

Referring now to FIG. 9, an example flowchart of a method 900 of connecting to the server 300 from an IoT device, such as an electronic lock 100, is shown.

In a first stage 910, the IoT device is powered on. At 912, the IOT device may wake upon the expiration of a timer or upon an external state change request from a mobile device or a web application. When the IoT device wakes, at 914, the IoT device determines if the nonce is valid. If the nonce is not valid, at 916, a delta callback server (DCS) flag is cleared, and at 918 a connection to Wi-Fi is established. If the nonce is valid, the connection to Wi-Fi is established, without clearing the delta callback server flag.

At 920, the router is synced and at 922 the IoT device connects to the router. At 924, a DHCP/ARP is received, and at 926 the TCP/HTTP stack is loaded. The IoT device will, at 928, determine whether a delta callback server flag is true or false. A true delta callback server flag assessment at 928 reflects that a "delta callback server" is used. A present delta callback server generally corresponds to an indication that a web target is present for the IoT device to connect to (e.g., such as web target interface 826 of FIG. 8), as compared to when the delta callback server is not present, which corresponds to a situation in which only an IoT server interface (such as interface 808 of FIG. 8) is available. A false delta callback server flag represents that no such separate web interface is present/used.

If the delta callback server flag is false, this means that the delta callback server (e.g., a web server hosting the web target interface) is present, and the IoT device should connect to that server rather than directly to an IoT device interface. Accordingly, the process continues to a second stage 930. In this second stage 930, the IoT device is signed into the web target server (also referred to herein as a delta callback server). At 932, a single TLS process is started for forming a secure connection, and at 934, the IoT device connects to the web target server. The web target server will return a response to the IoT device indicating a status of changes to the mirror associated with the IoT device. In particular, the web target server can provide a few status responses in response to the connection from the IoT device. For example, the web target server can transmit a "40X" message, which indicates that there is no change to any settings associated with the IoT device, and therefore no further action would be required of the IoT device. However, a different response could indicate that a change has occurred that requires the IoT device to connect to the cloud server to synchronize settings with an associated mirror. Still further, a lack of response message may indicate to the IoT device that it should proceed to connect to the cloud server via the IoT device interface. Accordingly, if the IoT device determines that the response received is not a "40X" response (e.g., a response 404), the IoT device will initiate a connection to the cloud server in a third stage 950. However, a true response to a "40 X" valid resource response indicates that there is no change to the one or more settings. If there is no change to the one or more settings, the process moves to the fourth stage 970.

In the third stage 950, the IoT device will sign into the cloud server to determine updates between the IoT device and the mirror. At 952, the IoT device will generate a random number, and at 954, will restore a session ticket. The IoT device will, at 956, start a mutual secure connection process. The mutual secure connection process can include a process of mutual authentication, such as described in U.S. Provisional Patent Application No. 62/731,417, entitled "Authentication of Internet of Things Devices, Including Electronic Locks", the disclosure of which is hereby incorporated by reference in its entirety.

At 958, the IoT device will resume a communication protocol session with the cloud server, e.g., via the IoT server interface 808 of FIG. 8. The communication protocol session can be implemented, for example, using a message queuing telemetry transport (MQTT) communication protocol. At 960, the communication protocol session is started, and at 962, changes to the mirror are checked. At operation 964, a delta request is assessed; if true, changes have occurred, and an update command is sent to the IoT device at 966. A state change operation 968 will wait for state changes to be synchronized to the IoT device.

Based on the updated command sent to the IoT device at 966, the state of the IoT device is changed 968. For example, if the IoT device is a lock, the command may be a lock or unlock command, or a change to one or more settings or permissions of the lock. Other changes may be performed as well, and updates may be sent from the lock or other IoT device to the mirror, such as history information or other notifications received at the device/lock. Once the state change is complete, or alternatively, if the delta request returns a false result, the IoT device enters the fourth stage 970 to disconnect from the server and power down.

The fourth stage 970 is related to powering down the IoT device. At 972, a GUID is generated from the nonce. At 974, the updated reported states and the GUID are posted. At 976, the TLS/TCP stack is torn down, and at 978, the TLS/MQTT session state is stored. At 980, the Wi-Fi radio is powered down, and at 982 the delay timer is started, indicating a next connection sequence time. At 984, the IoT device returns to a sleep state.

Referring to FIG. 9 generally, it is noted that this method 900 may be repeated after the delay timer expires or a mobile device or server initiates a connection. Additionally, within each stage, one or more operations may be performed in different orders, depending on a particular implementation within the IoT device.

Figure 10:
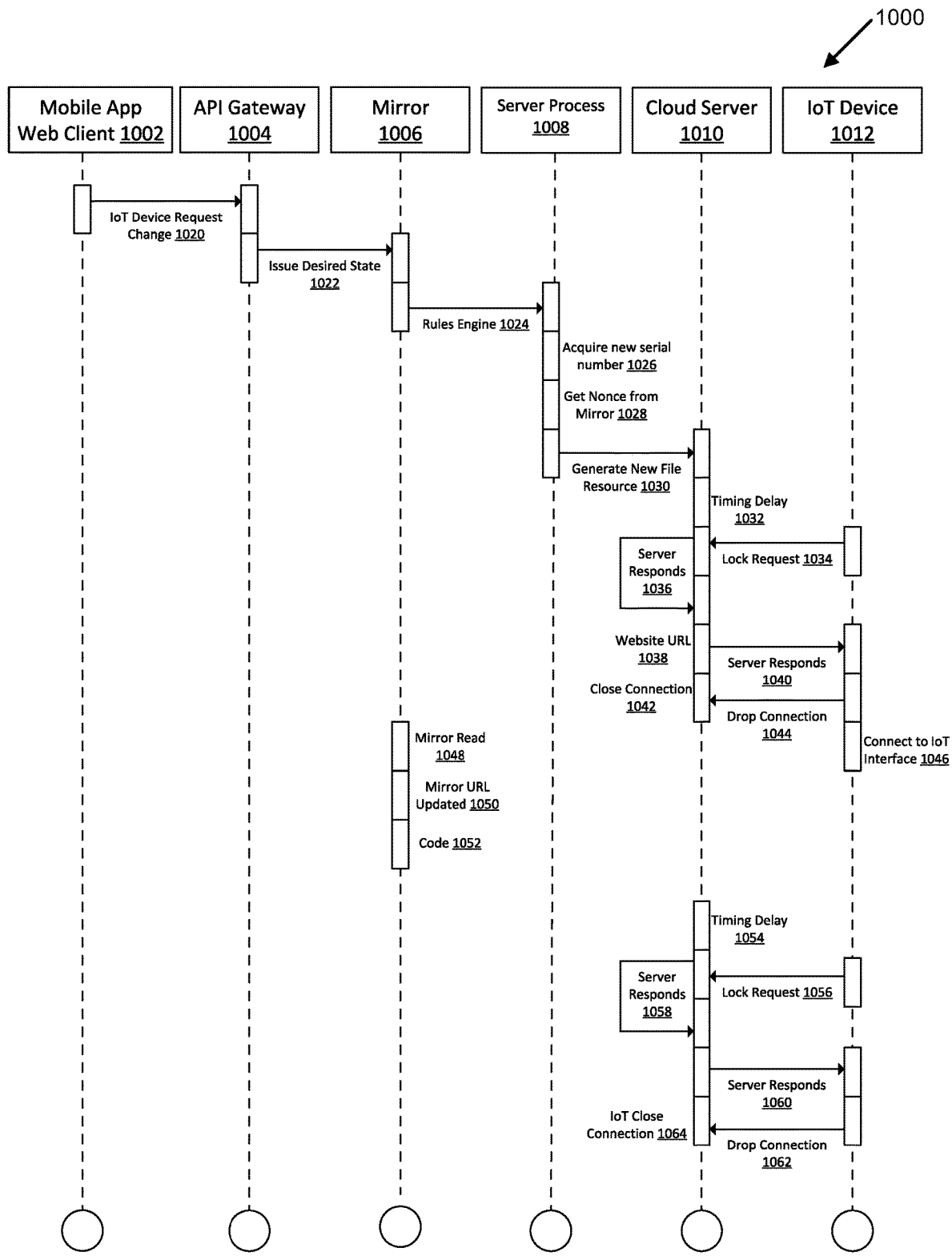
FIG. 10 illustrates an example timing diagram of the method of FIG. 9.

FIG. 10 illustrates an example timing diagram 1000 of a sever side callback device. The diagram outlines an example sequence of events that occur when a remote event, such as an external state change request from a mobile device, is introduced. The diagram also shows how each of the resources contributes to the overall response process.

At a mobile application web client 1002 (e.g., resident on a mobile device 200), a mobile device request change 1020 is sent to an API gateway (mobile API) 1004. The mobile API issues a desired state 1022 to a mirror 1006. Receiving the request from the API gateway causes the mirror 1006 to be updated, as well as to send a rule engine trigger 1024 to a server process 1008. The server process 1008 acquires a new serial number 1026 and then gets a nonce from the mirror at step 1028. A new file resource 1030 is generated and sent to a cloud server 1010. This new file resource will be accessed by an IoT device 1012 to determine whether updates at the mirror 1006 should be synchronized to the IoT device 1012.

After an optional delay 1032, for example 5 minutes, the IoT device 1012 issues a resource request 1034 to the cloud server 1010. If the IoT device is a lock, the request resource received is a lock request. The cloud server 1010 responds at 1036 by generating a website URL 1038, and sends back a response 1040 to the IoT device 1012 and closes the connection 1042. This results in the IoT device closing the connection at 1044.

Because a change has occurred to the mirror, the server response at 1040 will reflect that a change has occurred. Accordingly, the IoT device connects to the IoT interface at 1046 to synchronize with the mirror. In particular, at 1048, the mirror is read by the IoT device 1012. The mirror URL gets updated 1050, and then the new URL is stored 1052, and mirrored to the IoT device 1012. In this way, the mirror resource has a reference that is unique to the cloud server and the IoT device, allowing the IoT device to be uniquely identified by the URL it uses to connect to the cloud server 1010.

At this stage, the IoT device 1012 and mirror 1006 are synchronized. Accordingly, after a timing delay 1054 (e.g., 5 minutes or some other preconfigured time at the IoT device), the IoT device will send a second resource request to the predetermined URL at 1056. In this case, because there has been no change, the server response will be generated at 1058, causing a server response at 1060 to be a response "40X". Accordingly, the connection can be closed at 1064, and the IoT device 1012 will drop the connection at 1062 with no further action, since no updates are required that would cause the IoT device to connect to the mirror 1006.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. An internet of things device comprising:
a processor;
a memory communicatively connected to the processor, the memory storing instructions which, when executed, cause the internet of things device to:
 at a predetermined time, connect to a web target;
 receive, from the web target, a response indicating whether a change to one or more settings to the internet of things device has been received at a cloud server associated with the internet of things device;
 assess contents of the response;
 based on the response indicating that no change to the one or more settings has been received at the cloud server, terminate a connection to the web target without connecting to a secure internet of things server interface of the cloud server that is separate from the web target; and
 based on the response indicating that a change to the one or more settings has been received at the cloud server:
  establish a connection to the cloud server via the secure internet of things server interface;
  update one or more settings on the internet of things device based on the change to the one or more settings at the cloud server; and
  terminate the connection to the cloud server.

2. The internet of things device of claim 1, wherein the instructions further cause the internet of things device to, based on failing to receive a response from the web target:
establish a connection to the cloud server via the secure internet of things server interface;
update one or more settings on the internet of things device based on the change to the one or more settings at the cloud server; and
terminate the connection to the cloud server.

3. The internet of things device of claim 1, wherein terminating the connection to the cloud server includes terminating the connections to the web target and the secure internet of things server interface.

4. The internet of things device of claim 1, wherein the internet of things device comprises an electronic lock.

5. The internet of things device of claim 1, wherein the predetermined time corresponds to an expiration of a predetermined amount of time since a previous connection to the web target or an external state change request.

6. The internet of things device of claim 5, wherein the internet of things device is further configured to receive the external state change request from a mobile device.

7. The method of claim 1, wherein the internet of things device connects to a web target via a Wi-Fi protocol.

8. The method of claim 1, wherein after the connection to the cloud server is terminated, a delay timer is started.

9. A system comprising:
a server system hosting a web target; and
an internet of things device comprising:
 a processor;
 a memory communicatively connected to the processor, the memory storing instructions which, when executed, cause the internet of things device to:
  at a predetermined time, connect to a web target;
  receive, from the web target, a response indicating whether a change to one or more settings to the internet of things device has been received at a cloud server associated with the internet of things device;
  assess contents of the response;
  based on the response indicating that no change to the one or more settings has been received at the cloud server, terminate a connection to the web target without connecting to a secure internet of things server interface of the cloud server that is separate from the web target; and
  based on the response indicating that a change to the one or more settings has been received at the cloud server:
   establish a connection to the cloud server via the secure internet of things server interface;
   update one or more settings on the internet of things device based on the change to the one or more settings at the cloud server; and
   terminate the connection to the cloud server.

10. The system of claim 9, wherein the server system further comprises the cloud server.

11. The system of claim 10, wherein the web target is hosted by the cloud server.

12. The system of claim 10, wherein the web target and the cloud server are hosted by a cloud computing service remote from the internet of things device.

13. The system of claim 9, wherein the instructions further cause the internet of things device to, based on failing to receive a response from the web target:
establish a connection to the cloud server via the secure internet of things server interface;
update one or more settings on the internet of things device based on the change to the one or more settings at the cloud server; and
terminate the connection to the cloud server.

14. The system of claim 9, wherein terminating the connection to the cloud server includes terminating the connections to the web target and the secure internet of things server interface.

15. The system of claim 9, wherein the internet of things device is further configured to receive an external state change request from a mobile device.

16. The system of claim 9, wherein the internet of things device connects to the web target via a Wi-Fi protocol.

17. The system of claim 9, wherein after the connection to the cloud server is terminated, a delay timer is started.

18. A system comprising:
- a server system hosting a cloud server and a mirror account;
- a mobile device application; and
- an internet of things device comprising:
  - a processor;
  - a memory communicatively connected to the processor, the memory storing instructions which, when executed, cause the internet of things device to:
    - receive an external state change request initiated by the mobile device application;
    - determine whether to connect to a web target or a secure internet of things server interface separate from the web target;
    - based on at least one of (1) determining to connect to the secure internet of things server interface, or (2) an indication at the web target that an updated setting is available, establish a connection to the cloud server via the secure internet of things server interface;
    - update one or more settings on the internet of things device based on a change to the one or more settings within the mirror account at the cloud server, the mirror account being uniquely associated with the internet of things device; and
    - terminate the connection at the secure internet of things server interface to the cloud server.

19. The system of claim 18, wherein the internet of things device is in communication with the mobile device application via a Bluetooth connection.

20. The system of claim 18, wherein after the connection to the cloud server is terminated, a delay timer is started.

* * * * *